US008301628B2

(12) United States Patent
Clark et al.

(10) Patent No.: US 8,301,628 B2
(45) Date of Patent: Oct. 30, 2012

(54) PREDICTIVE ANALYTIC METHOD AND APPARATUS

(75) Inventors: Douglas Clark, Washington, DC (US);
Brian Pieslak, Washington, DC (US);
Brian Gipson, Colorado Springs, CO (US); Zachary Walton, New York, NY (US)

(73) Assignee: Metier, Ltd., Arlington, VA (US)

( * ) Notice: Subject to any disclaimer, the term of this patent is extended or adjusted under 35 U.S.C. 154(b) by 0 days.

(21) Appl. No.: 12/891,047

(22) Filed: Sep. 27, 2010

(65) Prior Publication Data

US 2011/0016078 A1    Jan. 20, 2011

Related U.S. Application Data (63) Continuation of application No. 11/330,337, filed on Jan. 12, 2006, now Pat. No. 7,822,747.

(60) Provisional application No. 60/642,983, filed on Jan. 12, 2005.

(51) Int. Cl.
*G06F 17/30* (2006.01)
(52) U.S. Cl. .................................. 707/736; 707/758
(58) Field of Classification Search ............... 707/736, 707/758
See application file for complete search history.

(56) References Cited

U.S. PATENT DOCUMENTS

| 5,111,400 A * | 5/1992 | Yoder ................................ 701/3 |
| 6,529,934 B1 | 3/2003 | Kawamura et al. |
| 6,631,346 B1 | 10/2003 | Karaorman et al. |
| 7,096,502 B1 | 8/2006 | Fox et al. |
| 7,181,438 B1 | 2/2007 | Szabo |
| 7,299,152 B1 | 11/2007 | Moritz |
| 2002/0129022 A1 | 9/2002 | Majewski et al. |
| 2003/0023573 A1 | 1/2003 | Chan et al. |
| 2003/0051054 A1 | 3/2003 | Redlich et al. |
| 2004/0003286 A1 * | 1/2004 | Kaler et al. .................... 713/201 |
| 2004/0078190 A1 * | 4/2004 | Fass et al. ........................ 704/7 |
| 2005/0154580 A1 * | 7/2005 | Horowitz et al. ................. 704/9 |
| 2005/0197775 A1 * | 9/2005 | Smith ................................ 702/3 |
| 2006/0028556 A1 * | 2/2006 | Bunn et al. ............... 348/211.99 |
| 2006/0101120 A1 | 5/2006 | Helsper et al. |
| 2008/0270592 A1 * | 10/2008 | Choudhary et al. .......... 709/223 |
| 2009/0326919 A1 * | 12/2009 | Bean ................................. 704/9 |

* cited by examiner

*Primary Examiner* — Son T Hoang
(74) *Attorney, Agent, or Firm* — Dickstein Shapiro LLP (57) ABSTRACT

A computerized project management analytical system and method that develops and manages an ontology that links objects and is capable of being mined. The ontology is comprised of a project ontology framework, a matching engine and a project status matrix that illustrates a multi-relational view of the project status, of confidence levels, or interdiction points and/or positions on project timelines.

20 Claims, 7 Drawing Sheets

| PROJECT TYPE | CIO | CMO | CFO | CTO |
|---|---|---|---|---|
| INFRASTRUCTURE MODIFICATION | | | | 9/11 1/10 1/11 1/12 1/1 1/2 1/3 3/12 |
| MARKETING SEMINAR | | 9/11 1/10 1/11 1/12 1/1 1/2 1/3 3/12 | | |
| NEW SOFTWARE APPLICATION | 9/11 1/10 1/11 1/12 1/1 1/2 1/3 3/12 | | | |
| FINANCIAL SYSTEM INTEGRATION | | | 9/11 1/10 1/11 1/12 1/1 1/2 1/3 3/12 | |

PREDICTIVE ANALYTIC METHOD AND APPARATUS

This application is a continuation of application Ser. No. 11/330,337, filed Jan. 12, 2006, now U.S. Pat. No. 7,822,747 which claims the benefit of U.S. Provisional Application Ser. No. 60/642,983, filed on Jan. 12, 2005, the entirety of which are hereby incorporated by reference.

This application claims benefit to U.S. Provisional Application 60/642, 983, which is herein incorporated by reference.

FIELD OF THE INVENTION

The invention relates to a computer-based project assessment tool for schematically matching information into a project scheme.

BACKGROUND OF THE INVENTION

Today, in project management, the focus of analysis and control is on the ability to estimate and associate what is effectively remembered as important with a given project. In other words, since seventy percent of all projects fail based on their original budget or finish date, it is clear that current systems struggle with successful estimations for outcomes. Part of this failure to predict, analyze and control project outcome stems from the inability to effectively mine and place into the proper context the avalanche of the data that could positively improve the predictive outcome of the project.

Project management, search software, data mining software and statistical/analytical tools could be used resolve project management shortfalls. However, these various tools exist in their own silos and are thereby not associated in a meaningful and usable manner. This failure is exacerbated as the complexity of projects increases as technology and society evolve.

Moreover, the concept of a project for many human endeavors is becoming widespread and mutating so that increasingly sophisticated tools, if applied correctly, could be implemented in more wide-ranging environments. For example, tools could be used in different ways, depending on the wide range of possibilities of what constitutes a "a project", and who is the "project manager". For example, a terrorist planning his or her attack could be a deemed a "project manager" in the same way a more traditional individual, such as a certified project engineer, could plan a construction, research or information technology project. Other environments that rely heavily on project management and control and that could benefit from a more sophisticated analytical approach to project management include but are not limited to the film industry, the automotive industry, advertising, drug/pharmaceutical research, clinical medical trials, to name a few.

A need therefore exists in the art for a predictive analytic system and method that employs the best available software tools and that run on standard computer hardware in order to provide project predictive analytics to the end user.

SUMMARY OF THE INVENTION

The above-described deficiencies are overcome by a system and method adapted for use on a computer platform that provides an ontology that links objects and is capable of being mined. The ontology is comprised of a project ontology framework, a matching engine and a project status matrix that illustrates a multi-relational view of the project status, of confidence levels, or interdiction points and/or positions on project timelines.

DETAILED DESCRIPTION OF THE INVENTION

The present invention described in the following specification and in the attached drawings wherein like elements are referenced to like reference numerals.

This invention is adapted for use on a host computer platform including on a personal computer, on a server, on a website, on a local or wide area network, on a PDA or on any other processor-based device known or used in the art.

The assessment tool or ontology of the present invention is an explicit formal specification of how to represent objects, concepts and other entities that are assumed to exist in an area of interest. The ontology links the objects and concepts with the relationships among the objects and concepts. The premise is based on the fact that today's organizations, whether government, commercial or otherwise, can be seen as project management specialists that oversee a diverse portfolio of related projects and these projects may share similarities.

Not only does the ontology mine data but it provides current status, while making predictions about future status. In its broadest sense, the ontology project framework uses a template for searching data. Instead of gathering data piece by piece, the template can encompass a whole data set seamlessly.

Specification tools, neural network technology and natural language processing are needed to create an effective ontology. The ontology uses specification tools, such as a Resource Definition Framework (RDF) and an Ontology Web Language (OWL), which allow complete areas of knowledge to be machine processed. Neural networks, such as Echo State Networks (ESN), simplify machine processing while increasing accuracy. In addition, powerful lexical dictionaries, such as WordNet® allow more accurate statistical natural language processing (NLP).

Objects and concepts are mined in projects. Any ontology may include a project portfolio. As will be described in the present specification, the system is set up to map or mine information to a particular project or activity within the ontology. The ontology matching scheme described herein has been contemplated in a number of different implementation applications. For example, the ontology can be used to predict terrorist or ontology "projects" for project management of important projects or even strategic initiatives in a corporate environment.

The ontology can be used for any application where there are relevant projects. For example, the ontology is used to predict terrorist threats. This implementation of the ontology is logical because terrorist organizations behave in a hierarchical structure. In the ontology, the actions or acts that terrorists carry out are projects. Using this structure and additional intelligence mapped into the ontology structure, terrorist projects can be predicted by analyzing the recent intelligence in conjunction with the terrorist project plan templates or maps. In an intelligence analysis perspective, the ontology allows systematic categorization of knowledge concerning a terrorist organization, a learning neural network of terrorist projects, high confidence predictions of project status, and threat warning and intervention.

Another example is an ontology that is implemented in a commercial setting. In one example, email, instant messaging and even computer keystrokes could be used to feed data into the ontology scheme. The email or other communication messages are used by employees to discuss work activities and the progress of such activities. The casual communication between employees is invaluable to the business. By tracking and using the communications, the progress of the strategic initiative and important projects can be predicted. The prediction is made by analyzing the corporate communication, against strategic alignment or project template plans. In the commercial setting, the ontology allows real time project status from mined documents, e-mail, instant messaging, and other project related data repositories, high confidence scenarios for risk management, and greater success in large complex projects. These implementation examples may be used throughout the specification to provide a context for the ontology scheme.

The ontology is comprised of three major components which are described in further detail in the attached figures. The project ontology framework (POF) is the first component. The project ontology includes template projects, discrete project activities, project roles, project template lexicons, project template lexicon networks, sponsor organization lexicons, sponsor organization social networks, sponsor organization lexicon networks, inter sponsor organization social networks, inter sponsor organizational lexicon networks, project template activity networks, inter project template activity networks, sponsor organization project portfolios, etc. The POF is a set of methods for constructing a project ontology.

The second component is the matching engine. The matching engine provides a method of associating a given piece of data with a discrete project activity or project template.

The third component of the ontology based system is a project status matrix that provides a multi-relational view display of a sponsoring organization by project templates, current assessment matching to show current status, confidence levels, interdiction points, and position on the project timeline.

The ontology schematic matching system is constructed using a machine readable language (e.g., OWL). OWL, for example, is a specification published by the world wide web consortium (w3c.org). OWL is designed to be used in those environments where the content of information is being processed, not just presented. OWL allows for improved machine interpretability of Web content by providing additional vocabulary along with formal semantics. OWL has three increasingly expressive sublanguages, including OWL Lite, OWL DL and OWL Full.

Project Ontology Framework (POF)

Figure 1:
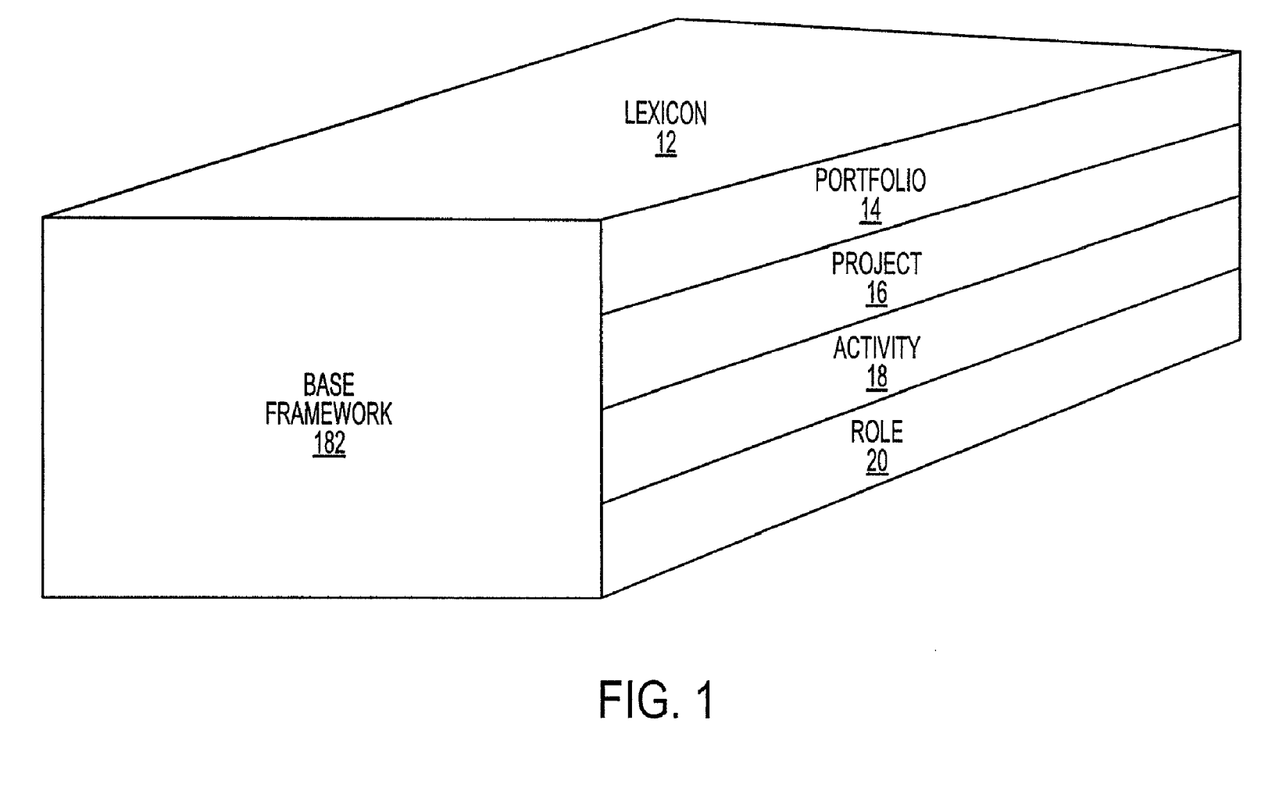
FIG. 1 illustrates an exemplary project ontology framework according to the present invention.

Each POF is constructed of five major classes and their subclasses. The ontology base framework is created from expert input, historical data, what-if exercises, analysis of other ontology states, as well as creative brainstorming. The classes include lexicon, portfolios, project templates, activity and role. Each of these classes has relationship ties to other classes by a class value. FIG. 1 illustrates an exemplary POF.

The first class of the POF 182 is the lexicon 12. The lexicon class 12 provides a knowledge base about a subset of words in the vocabulary of a natural language. The lexicon subclasses includes the WordNet® database, and entity and specialized lexicons mapped to the WordNet® database. The organization and specialized lexicons are appropriately linked to the classes to which the particularized lexicons apply through lexicon networks. Additionally, the lexicon class 12 includes lexicon networks which are networks/matrices of words, by use, networked grammatically/cognitively. Lexicon networks are constructed at the portfolio level as well as per project template, activity and role.

WordNet® is an open source application developed by and made available through Princeton University. In WorldNet®, nouns, verbs, adjectives, adverbs, etc., are organized into sets, each set representing one underlying lexical concept. The word sets are linked by different relations. Although, this invention is contemplated using WordNet® software, other lexical reference systems or tools inspired by psycholinguistic theories of human lexical memory can be used to develop the Lexicon.

The second class of the POF 182 is the portfolio 14. The portfolio 14 includes the subclasses of sponsor(s), projects (templates and ongoing projects), roles and lexicons not clearly associated with a project or an activity, related portfolios and other metadata. Role and activity information not clearly associated with a project or activity is kept in the portfolio structure 182 for later use.

The third class of the POF 182 is the project template 16. The project template 16 is made up of several subclasses. The first subclass delineates the sponsor organization. The sponsor organization is the group which is carrying out a particular activity (e.g., Hamas, a corporate competitor, an organization). Activities of the project 16 make up the second subclass. The activities are the different activities that are being carried out or need to be carried out to complete the project. The subclasses also include lexicons and roles that are not clearly associated with an activity. By maintaining this information, if at a later point the associated activity becomes clear, the data may be mapped to the appropriate activity. Additionally, the project templates allow for information relating to other related projects. The final subclass of the project templates is the other metadata.

The fourth class in the POF 182 is activities 18. The activity class 18 is comprised of verbs, nouns, adjectives, adverbs and roles. Additional subclasses include a time sequence of events or actions, related activities and other metadata.

The final class in the POF 182 is the role 20. The role class 20 is comprised of the subclasses of skills, functions, command relationship(s) (organizational chart level), tools, named individuals acting in this role, related roles, and other metadata.

The base POF 182 is the complete POF structure without any mapping of data. It is possible that the classes of the base POF 182 can change depending on changes to the relationship data and to the measured activity. The base POF 182 is continuously evolving as new relationship data is added and the fidelity in the base POF 182 increases as new relationship data is added. Changes to the base POF 182 are based on the guiding configuration management principals, policies and thresholds. By adhering to guiding configuration management principles, the base POF 182 cannot be changed at the whim of a user.

The POF 182 is a large network of relationships codified in machine readable language. Real time instances of the base POF 182 are created by combining a recurrent neural network algorithm (RNN), such as the Echo State Network (ESN) 206 (illustrated in FIG. 3), with the base POF 182. As data is input into the ontology, the RNN algorithm is constantly generating echoes of the base POF 182. Based on weight (w) and confidence cutoffs, certain echoes are captured.

Figure 2:
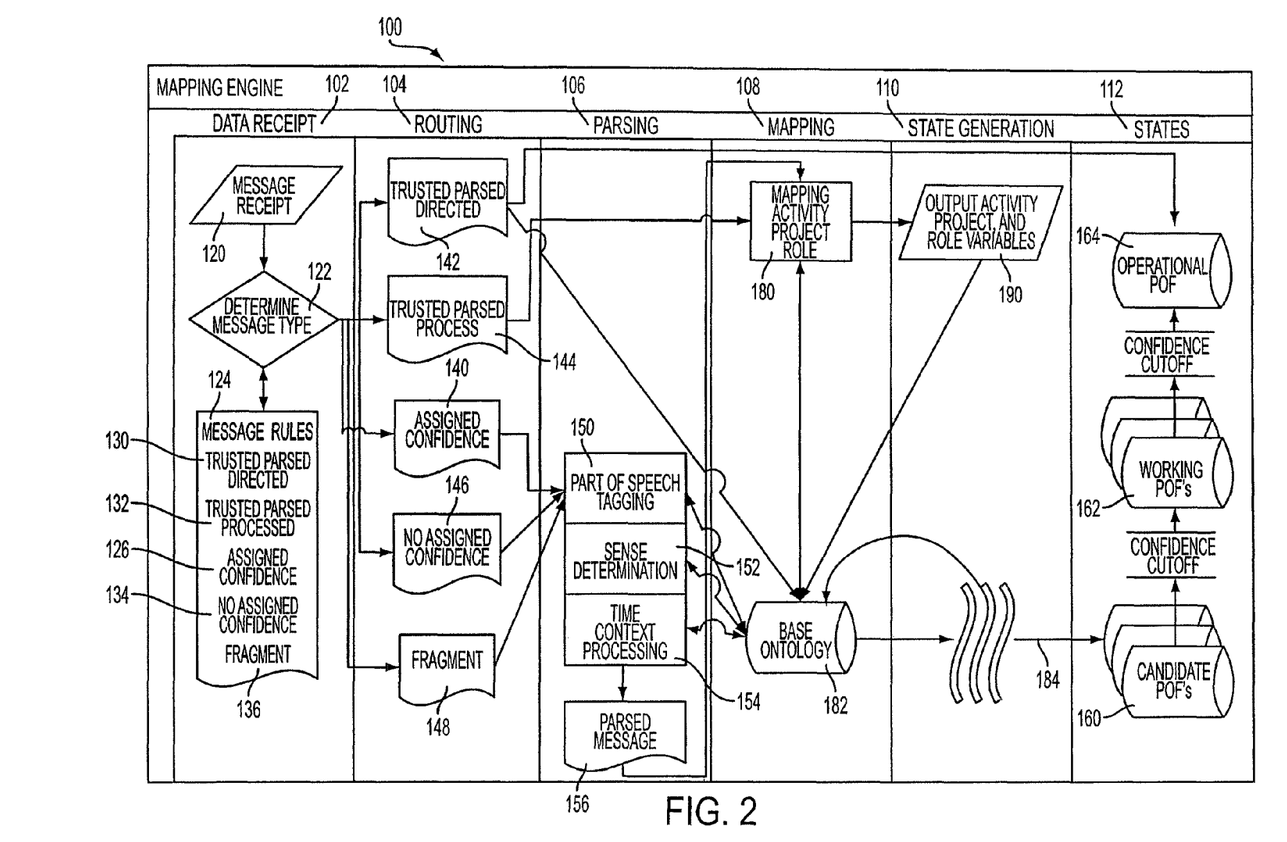
FIG. 2 illustrates an exemplary mapping engine according to the present invention.

There are three basic types of non-base POFs: candidate, working and operational POFs (see FIG. 2). The operational POF is the only POF that is used for status display and base POF refinement. The operational POF also represents the highest confidence echo based on the data that is mapped to the POFs. Information in the operational POF can and often is used to refine the base POF. The difference between candidate, working and operational POF is based on confidence cutoffs. A working POF does not replace the operational POF unless a user decides that it is a more accurate view of the POF. Additionally, because the POF status is based on confidence cutoffs, not every echo will rise to the level of a working POF.

However, echoes that do not rise to the level of working POFs and working POFs can be used later to backtrack and determine if information that has been mapped to a project, role, activity, etc., is still accurate.

Mapping Engine/Data Receipt & Routing

Referring now to FIG. 2, one of the main features of the ontology is a mapping engine 100. Regardless of where the mapping engine 100 maps intelligence data, the actions of the engine 100 remain generally the same. An exception is in the fidelity of the map. The mapping engine 100 carries out six functions, as illustrated in FIG. 2. These six functions include data receipt 102, routing 104, parsing and formatting 106, mapping 108, echo generation (state) 110 and echo maintenance 112.

The mapping engine 100 first classifies at 120 incoming intelligence based on the source of the information at 122. The source of the intelligence/data is used to determine which pathway of algorithms the data will travel in preparation for mapping. For example, unstructured data will undergo statistical Natural Language Processing (NLP), while machine-tagged data will go to a transformation function prior to mapping. The data will be processed into the proper RDF/OWL format before mapping.

The source of the data is used to create message types 122. Exemplary sources of data may include the internet, workflow, email, instant messaging, a document management server, or a project server. Each message type is governed by a rules engine 124 that provides subsequent processing. Processing can include, but is not limited to, evaluation of the source and message formatting (e.g., formatting the message into the proper OWL/RDF format). The rules engine 124 may also provide an initial scoring of the message. The confidence levels assigned throughout the POF ontology will be aggregated to classify the POFs as candidate 160, working 162 and operational 164 POFs. A confidence level is assigned based on the source of the data. The rules engine 124 is in effect, a series of software agents that reside near the repository or source of a message. Aggregate confidence levels are used in echo generation to determine which POF's are candidate, working and operational 160, 162 and 164 respectively.

Messages are classified into types, as illustrated in FIG. 2. The message types include "trusted parsed directed" 130, "trusted parsed process" 132, "assigned confidence" 126, "no assigned confidence" 134 and "fragment" 136.

The type of intelligence with the highest confidence type is "trusted parsed directed" 130. This message type is from a very high confidence source (e.g., workflow). The data is already parsed using WordNet®, is in the proper RDF/OWL format, and is directed via routing 142 to a specific area of the ontology. The message is directed to a specific place in the ontology by an end user or is automatically directed because of the source. Optionally, the message is created by an analyst based on multiple sources to provide a finished mapping of data directly to the highest confidence working POF or all of the POFs. This message type bypasses the parsing 106 and mapping 108 functions of the mapping engine 100.

The second message type is "trusted parsed process" 132. This message type is from a high confidence source, usually the end user. The message has already been parsed using WordNet®, is in the proper RDF/OWL format, and is sent directly through routing module 144 to the mapping engine 108, skipping the parsing function 106.

The third message type is "assigned confidence" 126. This message type is assigned a confidence route 140 by source or end user. However, it is a raw piece of data without parsing 106 or formatting (e.g., interne email). The message will proceed through 140 to the parsing function 106, as illustrated in FIG. 2, to be processed as described in more detail below.

The fourth message type "no assigned confidence" 134 is a raw piece of data without parsing 106 or formatting, but the source is known. Further, whether by source or the end user's direction, the data does not have an assigned confidence level 146. Subsequent processing will be used to determine the confidence level. The message will proceed through routing module 146 to the parsing function 106, as illustrated in FIG. 2.

The last message type, fragment 136, is also raw data without parsing 106 or formatting. However, the source of the data is unknown. Fragment data is weighted lower 148 in the subsequent confidence level processing routing. The message will proceed through routing module 148 therefore to the parsing function 106 as illustrated in FIG. 2.

Based on the message type and configurable rules 124 of the ontology framework, the data is routed either to the parsing and formatting 106 function, the mapping function 108, or directly into an echo(es) states 112.

Figure 5:
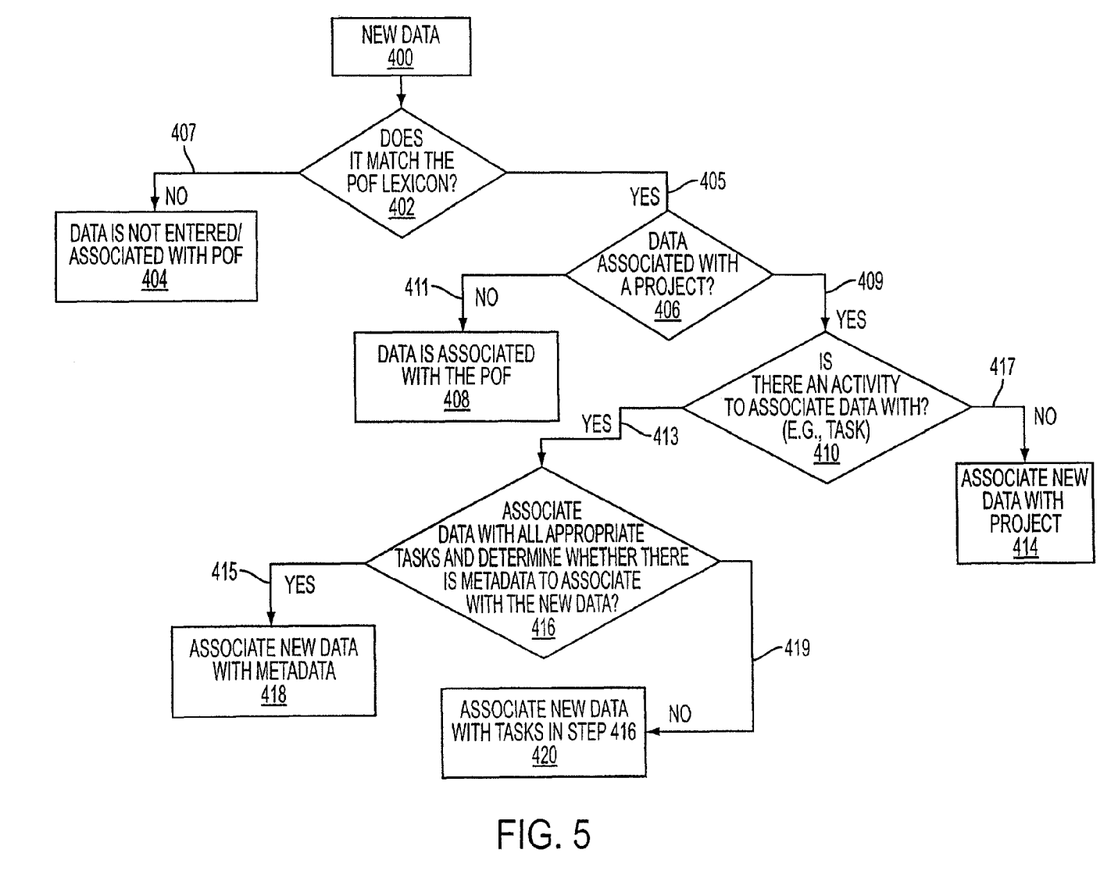
FIG. 5 is a flow chart illustrating the preferred embodiment of the invention.

FIG. 5 illustrates exemplary steps used for providing lexical processing as described with reference to the data receipt module 102 and routing module 104 in FIG. 2.

At 400, new data is provided to the mapping engine. That data is then tested at 402 to determine whether or not it matches the POF lexicon. If it matches at 405, then it is next determined whether the data is associated with a project at 406. If there is no matching project at 407, then the data is not entered and/or associated with the POF.

For data that is then successfully associated with a project 409, that data is then tested at 410 to determine whether or not there is an activity that can be associated with that data. An example of a type of activity is a task.

Data that is not successfully associated with a project 411, at 408 the data is associated with the POF. Also, data that is not associated successfully associated with an activity at 417 is associated with the identified project at 414.

Referring back to 410, if data can be associated with a task at 413, the data is then associated with all appropriate tasks and it is determined whether there is metadata to associate with the data. If matching metadata is available at 415, then the new data is also associated at 418 with the metadata. Data that is not matched to metadata at 419, is then associated with the tasks in step 416.

Mapping Engine—Parsing

The parsing function 106 uses statistical NLP to parse words within a message. Words in a message are tagged 150 as to the part of speech, definition and time 154 (e.g., today, yesterday, Sep. 11, 2001, two weeks, etc.).

The part of speech tagging 150 attempts to determine if a word is a noun, verb, determiner, adjective, adverb, pronoun, preposition, particle, conjunction, or number. In determining the part of speech, WordNet® Lookup, or other similar function in a comparable reference system, is performed for each of the words in a message. When WordNet® determines that the word has only one use (e.g., noun), the word is sent to sense processing 152. However, if a word has multiple parts of speech, sense determination 152 may play a deciding factor in determining the word's part of speech.

Brill Tagger is an open source application developed by Eric Brill and made available through www.cs.jhu.edu. A modified version of the open source Brill Tagger can be used as one means of part-of-speech tagging 150. Any other conventionally known speech tagging software or hardware, however, can be employed in conjunction with the present invention. Modified Brill Tagger is a modified version of the open source Brill Tagger coupled with WordNet® and sponsor lexicons. Based on rules associated with the transformation process and the polysemy counts of the associated word, the tags are given a confidence number for later evaluation. A tree traversal, statistical approach of WordNet® scores each part-of-speech for the words. A tree traversal traverses the chain of concepts (synonyms and related concepts) in the WordNet® database looking for common works in the message and the change of concepts to determine the sense. The tree traversal processing also determines the sense of the word 152. Both the tag 150 and the sense 152 are scored with a confidence 156 for final processing.

Wording mapping, including tagging 150 and sense determination 152 works as follows. The message is transformed into a series of networks by connecting words that are used in the same sentence, phrase, and clause (i.e., creating a words in context network). A master network is created by all of the sentence, phrase, and clause networks. Multiple uses of the same word in the message phrasing are depicted in the strength of the connection. The networks are actually stored as matrices of all of the words, as both row and column. The strength of connection between words is signified as a number. The algorithm next looks to the existing sponsor, project, and activity lexicons, or other training corpuses, to seek a similar sentence, phrase, and clause matrix. The entire message matrix is used to seek matching matrices in the project and activity lexicon matrices.

The highest confidence match is used to tag the part of speech 150, and select the appropriate sense 152 for each word in the message. A confidence score is applied for later processing.

The confidence scores are used to de-conflict differences in tag and sense selections using a combination of voting and highest confidence wins process.

After the part of speech tagging 150 and sense determination 152 is finished, each word is time context processed 154. Time context processing is a specialized form of sense determination. Each word is evaluated to determine if it's sense is related to time. The sense provided by the parsing function 106 is used to traverse through the chain of concepts in the WordNet® database or databases created by software having similar features to WordNet. If time related words/concepts are detected, an algorithm attempts to place the word on a continuous time-line. If possible, the word is given a distinct date, otherwise the word is given the appropriate level calendar fidelity.

Mapping and State/Echo Generation

Once part of speech tagging and sense selection is done for each word, the message is evaluated to extract and format the data according to the main areas of the ontology for mapping 108. The message is formatted according to the following roles at 180:

Portfolio Format—when more than one portfolio is present. Lexicon Format—to determine sponsor organization, project template, or activity. Project Template Format—to determine which project template. Activity Format—to determine the appropriate activity(ies) present in the message. Role Format—to determine the appropriate role(s) present in the message.

Each format allows the mapping process 108 or module 180 to step through the message from multiple perspectives. The mapping process 108 or module 180 generates an echo or state 110 for each format, as well as one encompassing all of the formats.

Figure 3:
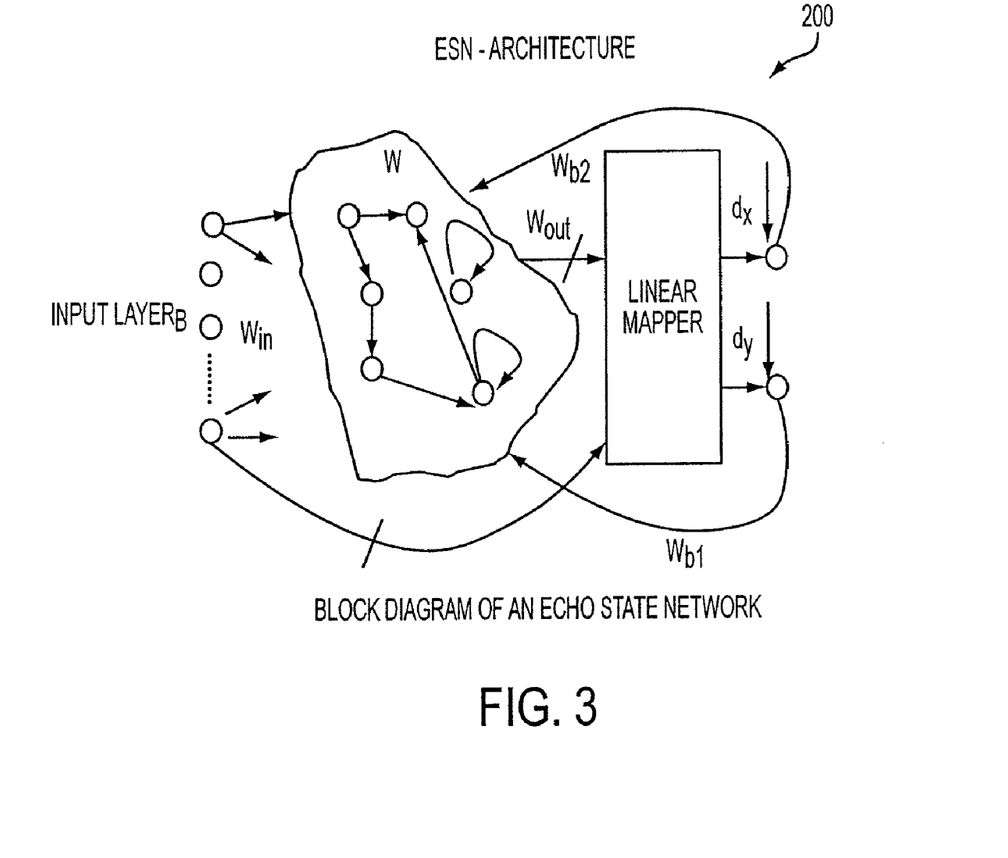
FIG. 3 illustrates a block diagram of an Echo State Network.

The reformatted message is input to at least one RNN algorithm, as illustrated in FIG. 3 (element 200) during the mapping module or process. Each project, activity, role, etc. may each have a RNN algorithm to process the inputted message. Ideally, the RNN algorithm tests the input message against the base POF 182 (FIG. 2). Each item within the POF has a threshold value for an output 184 to modify a candidate POF 160, working POF 162 and operational POF 164 status. A message may have only one high confidence match within the base POF 182, or it may have multiple matches (it may match multiple activities for example). A high confidence match is user definable, but would generally be considered as statistically significant. Once at least one match has been made, at least a second module of process generates an echo or state of the match 190 for each candidate 160, working 162, and the operational POF 164. New overall scores are then calculated, and if the match exceeds the candidate 160, or working 110 thresholds, or outscores the current operational POF, then the echoed state is promoted accordingly by module or process 190 through output 184.

For example, if an activity format message is fed into the module or process 180, it is evaluated against all of the activity internals based on match weight (see FIG. 3, element W). First, each activity word is evaluated to the activity lexicon including synonyms, antonyms, meronyms, holonyms, hypernyms, and sense. An aggregate score for each word is assigned based on the probability of the activity word matching the activity lexicon in the base POF 182.

Next, the activity lexicon network/matrix of the message is evaluated against the activity lexicon network/matrix in the base POF 182. The activity lexicon matrix is a networking of words that are linked from a grammatical and cognitive relationship. This evaluation is also given a score. The score represents the statistical probability that the message activity matrix matches the activity matrix in the POF. From there, each activity attribute is evaluated against each activity in the POF (e.g., time sequence, role, etc.) 190. If the overall score exceeds the match weight, then the match moves to the second algorithm. As the base POF 182 is refined, the match weights increase, thus increasing the confidence level of each POF state 112.

Status Matrix

Figure 4A:
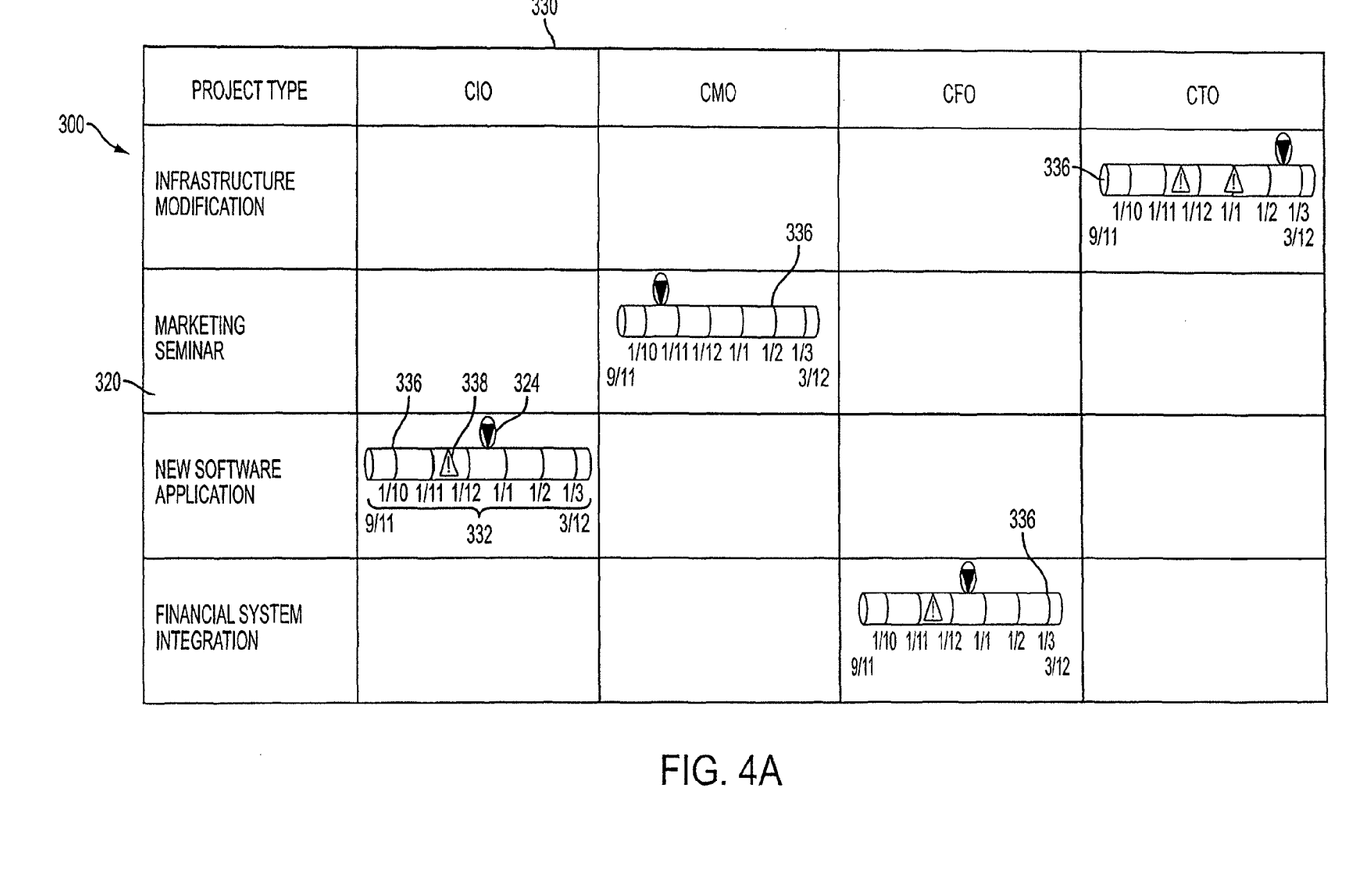
FIGS. 4A and 4B respectively illustrate exemplary display status matrices according to the present invention.
Figure 4B:
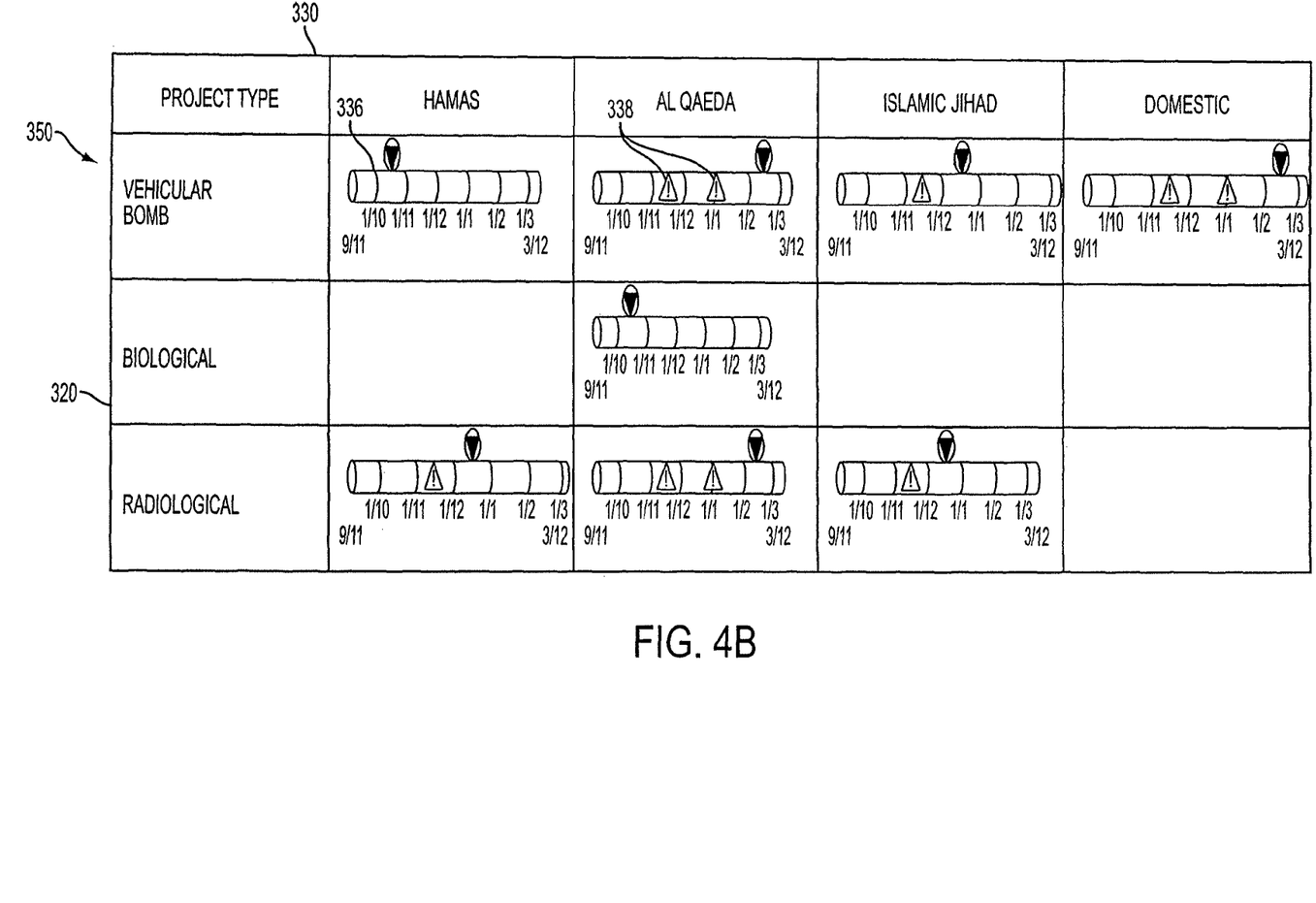

Referring now to FIGS. 4A & 4B, the project portfolio status matrix provides a visual display of the operational POF. Visualization can be accomplished on any known type of visualization hardware including but not limited to a CRT, flat panel projection, LCD or LED matrix, etc.

FIGS. 4A and 4B illustrate exemplary status matrices according to the present invention. The status is displayed by the sponsoring organization portfolio. The matrix provides a visualization of the projects based on the POF confidence level, and possible interdiction opportunities. The timelines maybe depict the status of the projects over a set period of time or may be adjustable for a specific time view.

FIG. 4A illustrates an exemplary status matrix 300 of the operational POFs that can exist in a commercial application. FIG. 4B illustrates an exemplary status matrix 350 of the operation POF that can exist if the project is based on terrorist projects. The matrix can provide information on projects that are jointly sponsored. The time lines may be depicted by a variety of colors to illustrate which projects are nearing completion or interdictions point, for example.

Referring to FIG. 4A, the vertical axis illustrates several typical commercial applications or types of projects 320 illustrated by the matrix 300. The horizontal matrix in this example shows different typical company offices or performing organizations 330 that relate to each gant bar 336. In this example, the offices represented include the company CIO (chief information officer), company CMO (chief marketing officer), company CFO (chief financial officer), and company CTO (chief technical officer).

The gant bar 336 is subdivided by time-based markers 332. The top marker 334 illustrates current project status based on the time line 332. The internal markers 338 represent a high risk area for a company. At this point, this is typically deemed a point of weakness where projects are most likely to fail or be delayed or suffer cost overruns.

In FIG. 4B, the same gant bar display 330 is applied to examples of the different types of projects (e.g. vehicular bomb, biological and radiological) for different types of performing organizations 330 (e.g. Hamas, Al Qaeda, Islamic Jihad and Domestic). However, the interdiction point, or points 338, now represent areas where police or military intervention is optimal, and where these projects have their greatest weakness and exposure points.

Figure 6:
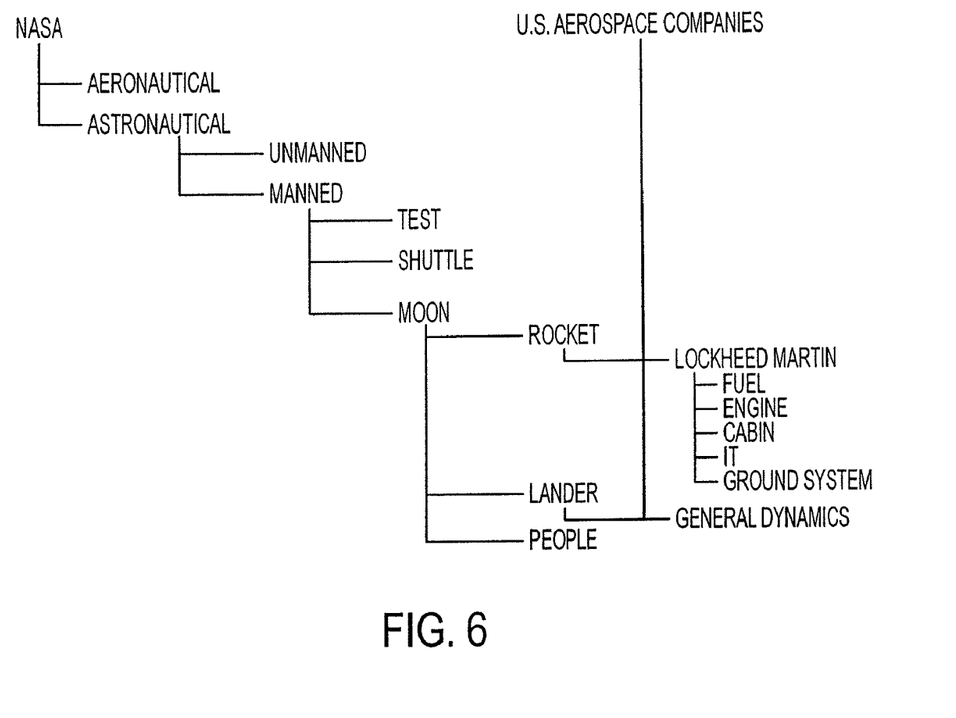
FIG. 6 is an example of a project ontology for the aerospace industry.

FIG. 6 illustrates an exemplary project ontology, according to the afore-described invention, providing the intersection of two taxonomies.

The above description and accompanying figures are only illustrative of exemplary embodiments that can achieve the features and advantages of the present invention. It is not intended that the invention be limited to the embodiments shown and described in detail herein.

What is claimed as new and desired to be protected by Letters Patent of the United States is:

1. A computer based assessment tool for providing a current project status and predicting a future project status, the tool comprising:
   a computer memory storing a project ontology framework (POF), wherein the POF has at least one class and subclass;
   one or more computer processors configured to:
      classify a plurality of incoming messages into a class or subclass within the POF based on a source of each of the messages and assign a confidence level to each of the incoming messages based on the classification;
      extracting the current project status from the plurality of incoming messages based on the source and the assigned confidence level of each of the incoming messages;
      input first classified messages with a first assigned confidence level into a matching function that:
         compares the first classified messages to pre-stored data formatted according to the POF,
         generates a match score, and
         modifies an operation of the POF when the match score exceeds a certain threshold;
      inputs second classified messages with a second assigned confidence level to a mapping function that:
         formats the second classified messages according to at least one class within the POF, and
         inputs the formatted second classified messages into the matching function;
      inputs third classified messages with a third assigned confidence level into a parsing function that:
         parses words and phrases in the third classified messages,
         generates tags identifying attributes of the parsed words and phrases in the third classified messages, and
         inputs the third classified messages with the tags into the mapping function, and
         inputs results of the mapping function corresponding to the third classified messages with the tags into the matching function;
      predicts the future project status based on match score of each of the plurality of incoming messages based on the matching function;
      generates a status matrix providing a multi-relational representation of the current project status and predicted future project status; and
   a display configured to display the status matrix.

2. The computer based assessment tool of claim 1, wherein the POF includes a plurality of template projects, discrete project activities, project roles, project template lexicons, project template lexicon networks, sponsor organization lexicon, sponsor organization social networks, sponsor organization lexicon networks, inter-sponsor organization social networks, inter sponsor organizational lexicon networks, project template activity networks, inter project template activity networks, and a sponsor organization project portfolio.

3. The computer based assessment tool of claim 1, wherein the status matrix is organized by a sponsoring organization.

4. The computer based assessment tool of claim 3, wherein the status matrix of the sponsoring organizations is broken down into projects.

5. The computer based assessment tool of claim 1, wherein the status matrix includes a plurality of interdiction points, confidence levels, current status and a position on the project timeline, wherein each of the plurality of interdiction points representing a time when a threat has a weakness or an exposure point.

6. The computer based assessment tool of claim 1, wherein the POF is broken down into multiple classes including at least lexicon, portfolios, project templates, activities and roles.

7. The computer based assessment tool of claim 6, wherein the lexicon class provides a knowledge base about a subset of words in a vocabulary of a natural language.

8. The computer based assessment tool of claim 7, wherein the lexicon class includes lexicon networks which are networks or matrices of words that are networked grammatically and cognitively.

9. The computer based assessment tool of claim 8, wherein the lexicon networks are constructed at a portfolio level, per project template, activity and role.

10. The computer based assessment tool of claim 6, wherein the lexicon class includes a WordNet® database, and entity and specialized lexicons mapped to the WordNet® database.

11. The computer based assessment tool of claim 6, wherein the portfolio class includes subclasses of sponsor, projects, roles and lexicons not clearly associated with a project or an activity, related portfolios and other metadata.

12. The computer based assessment tool of claim 6, wherein subclasses of the project template include at least a plurality of sponsor organizations, lexicons and roles that are not clearly associated with an activity, and other meta data.

13. The computer based assessment tool of claim 6, wherein the activity class of the POF is comprised of at least one of verbs, nouns, adjectives, adverbs, roles, time sequence of events or actions, related activities and other meta data.

14. The computer based assessment tool of claim 6, wherein the role class of the POF is comprised of subclasses of skills, functions, command relationships, tools, named individuals acting in a particular role, related roles and other meta data.

15. The computer based assessment tool of claim 6, further comprising: a base POF that is a complete POF structure without any mapping of data.

16. The computer based assessment tool of claim 15, wherein classes of the base POF can change depending on changes to relationship data and to measured activity.

17. The computer based assessment tool of claim 16, wherein real time instances of the base POF are created by combining a learning algorithm with the base POF.

18. The computer based assessment tool of claim 17, wherein as data is inputted into the assessment tool, the learning algorithm is constantly generating echoes of the base POF, wherein the echoes are used to control quality of the inputted data.

19. The computer based assessment tool of claim 1, wherein the one or more processors are configured to perform functions including data receipt, routing, parsing and formatting, mapping, echo generation and echo maintenance, wherein echoes are used to control quality of the inputted data.

20. A system for threat prediction, comprising:
a computer memory storing a project ontology framework (POF), wherein the POF has at least one class and subclass;
one or more computer processors configured to
associate a given piece of data with a class or subclass within the POF based on a source of the given piece of data,
extract a current project status from the given piece of data associated with the class or the subclass,
assign a confidence level to the given piece of data associated with the class or subclass,
compares the given piece of data with the assigned confidence level to pre-stored data formatted according to the POF,
generate a match score based on the comparison,
predict a future project status based on the match score,
identify at least one threat within the current project status and the predicted future project status,
generate a status matrix providing a multi-relational representation of a current project status and a future project status, wherein
the status matrix illustrating timelines for a plurality of projects associated with a plurality of organizations,
each timeline including a first marker indicating the current project status on a project timeline and a second marker indicating at least one interdiction point representing a time on the project timeline when the at least one threat has a weakness or an exposure point;
a display configured to display the status matrix.

* * * * *